US007056542B1

(12) United States Patent
Bridger et al.

(10) Patent No.: US 7,056,542 B1
(45) Date of Patent: Jun. 6, 2006

(54) GUM BASE

(75) Inventors: Lynton Alexander Bridger, Auckland (NZ); Adrian Stewart Denham Kerr, Auckland (NZ); Jean-Pierre Ghislain Dufour, Dunedin (NZ); Patrick Joseph Silcock, Dunedin (NZ); Stephanie Therese Vincent, Nelson (NZ)

(73) Assignee: Fonferra Tech Limited, Ruckland (NZ)

( * ) Notice: Subject to any disclaimer, the term of this patent is extended or adjusted under 35 U.S.C. 154(b) by 0 days.

(21) Appl. No.: 10/182,225

(22) PCT Filed: Jan. 27, 2000

(86) PCT No.: PCT/NZ00/00003

§ 371 (c)(1),
(2), (4) Date: Oct. 1, 2002

(87) PCT Pub. No.: WO01/54512

PCT Pub. Date: Aug. 2, 2001

(51) Int. Cl.
*A23G 3/30* (2006.01)

(52) U.S. Cl. .............................................. 426/6; 426/3
(58) Field of Classification Search .................... 426/3, 426/6
See application file for complete search history.

(56) References Cited

U.S. PATENT DOCUMENTS

| 3,814,815 | A | * | 6/1974 | Hashimoto et al. ............ 426/3 |
| 4,479,969 | A | | 10/1984 | Bakal et al. |
| 4,975,287 | A | * | 12/1990 | Zibell et al. .................... 426/3 |
| 4,992,420 | A | | 2/1991 | Neeser |
| 4,994,441 | A | | 2/1991 | Neeser |
| 5,015,628 | A | | 5/1991 | Reynolds |
| 5,130,123 | A | | 7/1992 | Reynolds et al. |
| 5,153,011 | A | | 10/1992 | Patel et al. |
| 5,227,154 | A | | 7/1993 | Reynolds |
| 5,882,702 | A | | 3/1999 | Abdel-Malik et al. |
| 6,350,480 | B1 | | 2/2002 | Urnezis et al. |
| 6,355,265 | B1 | | 3/2002 | Ream et al. |
| 2002/0004083 | A1 | | 1/2002 | Yatka et al. |
| 2002/0037340 | A1 | | 3/2002 | Urnezis et al. |

FOREIGN PATENT DOCUMENTS

| EP | 0 425 081 A2 | 8/1990 |
| JP | 52-120168 A | 3/1976 |
| JP | 55-165755 A | 12/1980 |
| JP | 04-041417 A | 1/1990 |
| WO | WO 94/00146 A | 1/1994 |
| WO | WO 96/28041 | 3/1995 |
| WO | WO 98/58550 | 6/1997 |
| WO | WO 99/39588 | 2/1998 |
| WO | WO 98/15189 A | 4/1998 |
| WO | WO 00/05972 A | 2/2000 |
| WO | WO 01/24640 A2 | 10/2000 |

OTHER PUBLICATIONS

Derwent Abstract Accession No. 86-228861/25, JP, A, 61-158751 to Kanebo Shoukuhin KK, Jul. 18, 1986.

* cited by examiner

Primary Examiner—Arthur L. Corbin
(74) Attorney, Agent, or Firm—Knobbe Martens Olson & Bear LLP

(57) ABSTRACT

The invention relates to chewable gum base compositions, to chewing gums containing them, and to processes for preparing them. The gum base compositions comprise (a) a polyvinyl acetate matrix, in which the polyvinyl acetate is in the form of a continuous phase, and (b) casein, a modified casein, or both casein and a modified casein, wherein particles of casein and/or modified casein are dispersed throughout the polyvinyl acetate matrix.

In preferred embodiments the gum base compositions also contain polyglycerol polyricinoleate, mono- and di-glycerides esterified with mono-acetyl and di-acetyl tartaric acid, acetylated monoglycerides, lecithin and sodium or calcium stearoyl-2-lactylate. Chewing gums of the present invention contain a chewable gum base as described above, in combination with one or more sweeteners and/or flavouring agents, and preferably also glycerol triacetate and stearic acid.

24 Claims, No Drawings

GUM BASE

FIELD OF THE INVENTION

This invention relates to new chewable gum base compositions, to products made from such compositions, in particular to chewing gums, and to processes for preparing same.

BACKGROUND OF THE INVENTION

Chewing gum is a popular consumer product, because of its taste and the chewing sensation that it provides. However, conventional chewing gums, when spent, have a strong tendency to stick to surfaces such as carpets and sidewalks, and retain their stickiness for a considerable period of time. They are also non-biodegradable. Accordingly, conventional chewing gums, if disposed of improperly, can cause an unsightly litter problem that is difficult to remove. This has led to restrictions on the sale of conventional chewing gums in some countries.

It would therefore be desirable to provide a chewing gum which goes some way towards overcoming these problems, while at the same time maintaining good chewing properties and therefore acceptability to consumers.

WO 98/15189 of Warner Lambert Company discloses a process in which a blend of a protein component and a plasticizer component is heated under controlled shear conditions to form a plasticized proteinaceous material, which may be used for producing gums and confectionery compositions.

SUMMARY OF THE INVENTION

It is an object of the present invention to provide a gum base composition which goes some way towards meeting the above desiderata, or at least to provide the public with a useful choice.

Accordingly, in one aspect, the present invention provides a chewable gum base composition comprising (a) a polyvinyl acetate matrix, wherein the polyvinyl acetate is in the form of a continuous phase, and (b) casein, modified casein, or both casein and a modified casein, wherein particles of casein and/or modified casein are dispersed throughout the polyvinyl acetate matrix.

In a preferred embodiment, the gum base composition contains acid casein. In a particularly preferred embodiment, the gum base contains both acid casein and fine ground acid casein.

In another preferred embodiment, the gum base contains both acid casein and acid casein which has been polymerised using transglutaminase, or hydrolysed acid casein which has been polymerised using transglutaminase.

It is particularly preferred that the polyvinyl acetate comprises a blend of polyvinyl acetates having differing molecular weights.

In addition, the gum base composition preferably includes one or more non-toxic plasticizers and/or emulsifiers. Preferably, the gum base includes mono- and di-glycerides esterified with mono-acetyl and di-acetyl tartaric acid (Datem), acetylated mono- and/or di-glycerides and polyglycerol polyricinoleate.

In a particularly preferred embodiment, the gum base composition further includes the additional emulsifiers lecithin and sodium stearoyl-2-lactylate or calcium stearoyl-2-lactylate.

It is also preferred that the gum base composition includes a texturiser, conveniently calcium chloride, which is conveniently combined with the casein or modified casein prior to formulation of the gum base.

The gum base composition preferably also includes a filler such as talc.

In another aspect, the invention provides a confectionery product containing a chewable gum base composition as defined above.

In a further aspect, the present invention provides a chewing gum containing a chewable gum base composition as defined above.

In a preferred embodiment, the chewing gum further comprises glycerol triacetate and stearic acid, in combination with one or more sweeteners and/or flavouring agents.

In a further aspect the present invention provides a process for preparing a chewable gum base composition comprising particles of casein and/or modified casein dispersed throughout a polyvinyl acetate matrix, the process comprising the steps of heating polyvinyl acetate, together with one or more plasticizers and/or emulsifiers that are suitable to plasticize the polyvinyl acetate, to a temperature sufficient to melt the polyvinyl acetate, and mixing casein, a modified casein, or both casein and a modified casein with the molten polyvinyl acetate composition, to form a homogenous composition.

Preferably, the polyvinyl acetate is initially heated to a temperature of between about 55° C. and about 110° C. with the one or more plasticizers and/or emulsifiers.

Preferably the casein and/or modified casein are added after the polyvinyl acetate is molten, and the casein and/or modified casein are mixed in to the composition while the composition is at a temperature of from about 40° C. to about 90° C.

Preferably, the process includes the additional step of adding one or more further emulsifiers to the composition, preferably after the casein has been mixed into the composition.

Preferably, the process further includes the additional step of adding a filler such as talc to the composition, preferably after mixing of the casein into the composition.

Preferably, the casein and/or modified casein is mixed with a texturising agent, preferably calcium chloride, before combining it with the polyvinyl acetate composition.

In further aspects, the present invention provides a chewable gum base obtainable by a method as defined above, and a chewing gum including such a gum base.

DETAILED DESCRIPTION OF THE INVENTION

While the invention is broadly as defined above, it will be appreciated by those persons skilled in the art that it is not limited thereto but that it also includes embodiments of which the following description provides examples.

This invention relates to a non-toxic, chewable gum base composition and to products containing the gum bases, and in particular to chewing gums. The chewable gum bases of the present invention contain casein, or a modified casein, or both, and the gum base is in the form of particles of casein or modified casein dispersed throughout a polyvinyl acetate matrix.

The applicants have surprisingly found that a non-toxic, chewable gum base, having very good cohesion and chewing properties, can be formulated by providing a composition in which particles of casein/modified casein are dispersed substantially uniformly throughout a polyvinyl acetate matrix. In the compositions of the present invention, the polyvinyl acetate is present, together with one or more plasticizers and/or emulsifiers, as the continuous (plasticized) phase of the gum base, and particles of casein/modified casein, generally in the form of aggregates of casein/modified casein molecules, are dispersed throughout this continuous phase. The casein/modified casein itself is not substantially plasticized or in the form of a continuous phase.

It is believed that the casein or modified casein particles contribute to the texture and chewing properties of the gum base composition by imparting a degree of "rubberiness", and also bulkiness, to the composition.

Chewing gums made from such gum base compositions also have the advantage that they are sufficiently non stick that they can be easily removed from most surfaces including carpet, clothing and hair.

The gum base compositions of the invention have also been found to be disintegratable and are made of substantially biodegradable components.

The chewable gum base compositions of the present invention will now be described in more detail.

As defined above, the chewable gum base formulations of the invention contain casein or a modified casein, or both. In a preferred embodiment of the invention, the casein is simply acid casein. For example, 80 mesh casein (100% with a particle size of less than 250 microns, and 85% with a particle size less than 180 microns) may be used. In a particularly preferred embodiment, the gum base comprises both acid casein and fine ground acid casein (for example, having a particle size less than about 10 microns).

The addition of some fine ground acid casein in addition to acid casein has been found to increase the smoothness of the resulting gum base, although it is desirable to have some casein in the gum of a larger particle size such as 80 mesh, to retain good chewing properties. Without wishing to be bound by any theory, it is believed that larger particles of casein may enable a more constant level of rubberiness in the gum base by absorbing moisture more slowly than smaller particles on chewing.

In alternative embodiments the casein can be modified, for example by enzymatic or chemical cross-linking, to control the degree of swelling of the casein. This in turn may enhance the "rubberiness" of the gum base, while at the same time allowing a smaller particle size of casein to be used and thereby resulting in a smoother gum.

In alternative preferred embodiments, the gum base includes both acid casein and a modified casein. In these embodiments, the modified casein is preferably acid casein which has either been polymerised using the enzyme transglutaminase, or acid casein which has first been hydrolysed using a suitable enzyme, preferably trypsin, and then polymerised using transglutaminase.

In this specification, the term "modified casein" includes a casein which has been treated with one or more enzymes and/or chemicals (such as hexanal or acetic anhydride) to alter its structure, for example to polymerise it and thereby produce a casein with a higher molecular weight. Specific examples of modified caseins suitable for use in the gum base compositions of the present invention include (but are not limited to), polymerised hydrolysed casein, polymerised casein, thiolated casein, hexanal-modified casein and palmitoyl-modified casein. The term "modified casein", as used herein, also includes caseinates such as sodium caseinate and calcium caseinate.

For the avoidance of doubt, the term "casein", as used herein, includes both acid casein and rennet casein.

In alternative embodiments, the gum base may include another protein or proteins, in addition to the casein/modified casein. Other proteins which can optionally be included with the casein/modified casein in the gum base formulation are protein-containing whey derivatives (such as whey protein isolates and whey protein concentrates), wheat gluten and wheat protein isolates.

It is generally preferred that the casein or modified casein, or combination of casein and modified casein, is present in the gum base in a total amount in the range of from about 5% to about 30%, more preferably, about 12–16.5%, by weight of the total ingredients included in the gum base formulation.

If an additional protein such as wheat gluten is included, this is preferably present in an amount of from about 4% to about 13% by weight of the formulation.

It is also generally preferred that a texturising agent which interacts with the casein/modified casein is included. Conveniently, the texturising agent is calcium chloride. It is preferred that the calcium chloride is present in an amount of up to about 1.5% by weight of the total ingredients in the gum base formulation, more preferably about 0.4%–0.6% by weight. Other suitable calcium salts and divalent cations will be apparent to those skilled in the art.

The gum bases of the present invention also contain polyvinyl acetate, which provides both substance and extensibility to the gum base. Preferably, the polyvinyl acetate has a molecular weight ranging from approximately 12,000 to approximately 40,000. It is generally preferred that the polyvinyl acetate is present in an amount from about 20% to 65%, more preferably about 35% to about 56%, by weight of the total ingredients included in the formulation. It is also preferred that a combination of polyvinyl acetates having different molecular weights is used. In one particularly preferred embodiment, a combination of four polyvinyl acetates having molecular weights of approximately (1) 12,900, (2) 14,000, (3) 25,000 and (4) 40,000 respectively is used in the gum base. These four polyvinyl acetates are preferably present in the gum base composition in proportions in the ranges of: (1) up to about 25% by weight; (2) up to about 25% by weight; (3) about 12%–25% by weight; and (4) about 5% to about 18% by weight, respectively.

The gum base formulation of the present invention also includes one or more emulsifiers and/or plasticizers.

Suitable plasticizers and emulsifiers include mono- and di-glycerides esterified with mono-acetyl and di-acetyl tartaric acid (Datem), polyglycerol polyricinoleate, acetylated mono-and/or di-glycerides, sodium and calcium stearoyl-2-lactylate, lecithin, liquid acetylated monoglycerides, polysorbate 60, mono- and di-glycerides esterified with citric acid and mono- and di-glycerides esterified with lactic acid and sodium deoxycholic acid. It will be appreciated that these compounds may function as both emulsifiers and plasticizers for polyvinyl acetate.

It is preferred that the gum base of the present invention contains both polyglycerol polyricinoleate and Datem. It is more particularly preferred that the gum base contains the following combination of emulsifiers and plasticizers: (1) Datem, (2) acetylated mono and/or di-glycerides, and (3) polyglycerol polyricinoleate, present in amounts of (1) from about 1 to about 24% by weight, more preferably from about 1-about 15% by weight, (2) up to about 24% by weight, more preferably about 1- about 10% by weight, and (3) from about 4.4 to about 20% by weight, more preferably about 6–11% by weight, respectively, of the total ingredients in the gum base formulation.

A preferred acetylated monoglyceride is that known as MYVACET 7-07™, which is produced from hydrogenated vegetable oil, has a melting point between 37° C. and 40° C. with a percent acetylation of between 66.5 and 69.5.

It is also particularly preferred that, in addition, the gum base formulation of the present invention includes both lecithin (preferably a lecithin with a relatively high solubility in acetone, such as that known as Emulpure N or Emulgum™, which are deoiled soybean lecithins having a minimum phospholipid content of 95% and an acetone insoluble content of 95% minimum), present in amounts of up to about 6% by weight (more preferably about 2 to about 4% by weight), and sodium stearoyl-2-lactylate or calcium stearoyl-2-lactylate, present in amounts of up to about 5% by weight (more preferably about 0.5 to about 3% by weight) of the total ingredients in the formulation.

The above combination of surfactants and plasticizers has been found to be particularly effective in plasticizing the polyvinyl acetate and maintaining an emulsion.

It is also preferred that the gum base of the invention includes a filler. Examples of suitable fillers include talc, calcium carbonate, magnesium carbonate, alumina, tricalcium phosphate and synthetic or natural clay, and mixtures thereof. A preferred filler is talc. The amount of talc present should be effective to provide a cohesive gum base with good chewing properties. It is generally preferred that the talc is present in an amount of up to about 25% by weight, more preferably about 7–13% by weight, of the total ingredients in the formulation.

Other components can also optionally be included in the gum base formulation if desired. Other optional components which can be included in the gum base are:

paraffin and micro-crystalline waxes at levels up to 5.0% by weight;

hardened fats at levels up to 2% by weight;

polycaprolactone (biodegradable polymer) at levels up to 2.0% by weight;

guar gum, at levels up to 0.5% by weight; and locust bean gum at levels up to 0.5% by weight.

terpene resin at levels up to 2% by weight carrageenan at levels up to 2% by weight.

Polyisobutylene (having a relative molar mass of 40,000) at levels up to 1% by weight.

Lanolin, at levels up to 3% by weight.

Preparation of Chewable Gum Base Composition

As described above, the chewable gum base compositions of the invention contain casein and/or modified casein particles dispersed throughout a polyvinyl acetate matrix. The polyvinyl acetate matrix is present in the gum base as a continuous phase.

The gum base compositions of the present invention may be prepared by combining polyvinyl acetate with one or more plasticizers and/or emulsifiers suitable to plasticize the polyvinyl acetate, at a temperature sufficient to melt the polyvinyl acetate. It is generally preferred that the polyvinyl acetate be heated to a temperature of from about 55° C.–140° C., more preferably about 70° C.–110° C. The plasticizers/emulsifiers and polyvinyl acetate are preferably mixed until the polyvinyl acetate is molten and a homogeneous mixture is obtained.

Casein and/or a modified casein is also added to the composition, which is then mixed until visually homogeneous. It is preferred that the casein/modified casein is added after the polyvinyl acetate is molten. The casein/modified casein is preferably added in a dry form, and preferably, before adding it to the composition, the casein is first mixed with a texturising agent such as calcium chloride.

It is generally preferred that, after the casein modified/casein is added, the mixing is carried out with the composition at a lower temperature, preferably between 40–90° C. (to minimise heat damage to the casein particles and consequent possible production of off flavours). Once a homogeneous, cohesive mixture has been obtained, the resulting mass is preferably removed from the heat, and additional emulsifiers may be added, with slow mixing, preferably when the temperature of the mass reaches about 55° C. A filler may then be added slowly, preferably when the temperature of the base reaches between 40° C.–80° C., and the mass mixed until it is homogeneous.

The shear levels that can be used to mix the gum base are similar to those used to mix conventional gum bases known in the art. However, as the lower temperatures preferably used when mixing the casein into the composition will result in the composition becoming more viscous, higher shear levels may then be required to achieve adequate mixing.

In one preferred embodiment, a method of preparing a chewable gum base formulation of the present invention is as follows: A Brabender Plasticorder (W 50 mixer, cam blades) is used with an initial temperature of approximately 100° C., and an initial speed of approximately 60 RPM. The acetylated monoglycerides, sodium or calcium stearoyl-2-lactylate, Datem and paraffin (if used) are added first, followed immediately by the polyvinyl acetates, and the temperature is then reset to approximately 60° C. The casein and calcium chloride are added at approximately 3 minutes. The speed is decreased to approximately 40 RPM just before adding the polyglycerol polyricinoleate and lecithin at approximately 8 minutes. Lastly the filler (eg talc) is added at approximately 9 minutes, and mixing is stopped at approximately 10 minutes.

In another preferred embodiment, a method of preparing a chewable gum base formulation of the present invention is as follows: A Brabender Plasticorder (W 50 mixer, cam blades) is used with an initial temperature of approximately 100° C., and an initial speed of approximately 60 RPM. The acetylated monoglycerides, sodium or calcium stearoyl-2-lactylate, Datem and paraffin (if used) are added first, followed immediately by the polyvinyl acetates, and the temperature is then reset to approximately 40° C. The speed is decreased to 40 RPM at 4 minutes. The polyglycerol polyricinoleate and lecithin are added at approximately 7 minutes and the filler (eg talc) is added at 8 minutes. The casein and calcium chloride are added at approximately 9 minutes and mixing stopped at 11 minutes. The gum base temperature is approximately 70° C. when the casein and calcium chloride are added and approximately 72° C. when the mixer is stopped.

If desired, prior to preparation of the gum base, the casein/modified casein to be used may be treated to remove low molecular weight material, for example by resuspending the casein in water followed by diafiltration. The pretreatment may result in the gum base having a cleaner flavour. A suitable method for pretreatment of the casein is as follows: Dried casein or de-watered casein curd is suspended in water (to give about 5–10% total solids) and the pH adjusted to between 7.0 and 7.5 and heated to 50° C. until dissolved. The solution is cooled to approximately 5° C. and diafiltered (approximately 6 theoretical volume changes).

The pH is adjusted to 4.6 with hydrochloric acid, heated to 50° C. and filtered. The recovered curd is dried (eg freeze dried) and ground to the desired particle size.

In the resulting gum base, the polyvinyl acetate forms the continuous, plasticized phase, throughout which individual particles of the casein/modified casein are dispersed.

Preparation of Ch Wing Gum

Chewing gums according to the invention can be prepared from the chewable gum bases described herein using conventional processes known in the art. These generally involve adding one or more sweeteners and/or flavouring agents to the gum base. The chewable gum base formulations of the present invention are suitable for making into either sugarless chewing gums or sugar-containing chewing gums.

The chewing gums of the invention preferably contain the gum base in an amount from about 15% to about 90% by weight, more preferably about 20% to about 50% by weight and still more preferably about 24% to 35% by weight of the chewing gum.

In one embodiment, a chewing gum of the invention is prepared by melting the gum base with a liquid sweetener, conveniently glucose syrup, at a temperature of from about 45° C. to 65° C., accompanied by mixing. This is followed by the incremental addition of small amounts of a further sweetener in solid form, conveniently glucose powder or powdered sucrose, and flavouring agents. If desired, maltodextrin (having a dextrose equivalent of between 20 and 25) may be substituted for glucose syrup at a rate of from about 9% to 18%. The reduced moisture content has been found to reduce stickiness and improve the chewing properties of the resulting gum.

Alternatively, the chewing gum of the invention may be prepared by incorporating the sweeteners and flavourings in the gum base using a suitable mixer. For example, a Brabender Plasticorder, fitted with a W 50 mixer (cam blades) and operated at a temperature of about 45° C. and a speed of 50 RPM can be used to produce a chewing gum according to the following steps:

1. The gum base and glucose syrup are mixed for 2 minutes;
2. 33% of the powdered sucrose is added, and mixed for 2 minutes;
3. 33% of the powdered sucrose is added with 50% of the flavours, and mixed for 3 minutes;
4. 33% of the powdered sucrose is added with 50% of the flavours, and mixed for 2 minutes; and
5. The gum mass is removed from the mixer and rolled to a thickness of 2–3 mm.

In a particularly preferred embodiment, the additional components glycerol triacetate (preferably in an amount of from about 0.5 to 4%, more preferably about 0.75% to 2.5% by weight of the final chewing gum) and stearic acid (preferably in an amount of from 0.5% to 1.5% by weight of the chewing gum) are also included into the chewing gum. The combination of glycerol triacetate and stearic acid has been found to improve the cohesion properties of the resulting chewing gum. Where glycerol triacetate and/or stearic acid are included, these are preferably added in step 1 of the above method.

The invention will now be further described with reference to the following non-limiting examples.

EXAMPLES

Example 1

| Ingredient | % (weight/weight) |
| --- | --- |
| Polyvinyl acetate (MW ~25,000) | 35.5 |
| Datem* | 13.8 |
| Acid casein | 13.8 |
| Wheat gluten | 12.0 |
| Polyglycerol polyricinoleate | 8.9 |
| Acetylated monoglycerides (Myvacet 7-07) | 9.2 |
| Lecithin (Emulgum) | 3.7 |
| Sodium stearoyl-2-lactylate | 2.5 |
| Calcium chloride | 0.6 |

*Diacetyl tartaric esterified mono- and di-glycerides

Method of Preparation of Gum Base

Polyvinyl acetate (10.65 g), Datem (4.14 g), acetylated mono-glycerides (2.76 g) and sodium stearoyl-2-lactylate (0.75 g) were heated to 110° C. with mixing. Acid casein (4.14 g), wheat gluten (3.6 g) and calcium chloride (0.18 g) were mixed into the first mixture until homogenous. Polyglycerol polyricinoleate (2.67 g) and lecithin (1.11 g) were combined and added to the mixture (50° C.±10° C.). The mixture was cooled to 18° C.–20° C. and stored in an air tight container.

Chewing gum having the following formulation was prepared from the gum base:

| Ingredient | % (weight/weight) |
| --- | --- |
| Powdered sugar | 44.0 |
| Gum base | 35.0 |
| Glucose syrup | 20.0 |
| Flavour | 0.25 |

Method of Preparation of Chewing Gum

Glucose syrup (84% solids) (5.0 g) was heated to 60° C. Gum base (8.8 g) was added and combined into the glucose syrup. Powdered sugar (11.0 g) was added slowly to the mixture and mixed until homogenous. Flavour (0.25 g) was mixed in gently. The gum was rolled into balls and stored in an air tight container.

Example 2

| Ingredient | % (weight/weight) |
| --- | --- |
| Polyvinyl acetate (MW ~25,000) | 35.5 |
| Datem | 13.8 |
| Acid casein | 13.8 |
| Filler (talc) | 12.0 |
| Polyglycerol polyricinoleate | 8.9 |
| Acetylated monoglycerides (Myvacet 7-07) | 9.2 |
| Lecithin (Emulgum) | 3.7 |
| Sodium stearoyl-2-lactylate | 2.5 |
| Calcium chloride | 0.6 |

A gum base was prepared having the above formulation using the following method: A Brabender Plasticorder (W 50 mixer, cam blades) was used, with an initial temperature of 100° C., and an initial speed of 60 RPM. The acetylated monoglycerides, sodium stearoyl-2-lactylate and datem were added, followed immediately by the polyvinyl acetate. The temperature was then reset to 60° C. The casein and calcium chloride were added at 3 minutes. The speed was decreased to 40 RPM just before adding the polyglycerol polyricinoleate and lecithin at 8 minutes. The talc was added at 9 minutes and mixing stopped at 10 minutes.

Chewing gum having a similar formulation to that of Example 1 above was prepared from the gum base using the following method:

A Brabender Plasticorder, fitted with a W 50 mixer (cam blades) and operated at a temperature of 45° C. and a speed of 50 RPM was used as follows:
1. The gum base and glucose syrup were mixed for 2 minutes;
2. 33% of the powdered sucrose was added, and mixed for 2 minutes;
3. 33% of the powdered sucrose was added with 50% of the flavours, and mixed for 3 minutes;
4. 33% of the powdered sucrose was added with 50% of the flavours, and mixed for 2 minutes; and
5. The gum mass was removed from the mixer and rolled to a thickness of 2–3 mm.

Example 3

| Ingredient | % (weight/weight) |
| --- | --- |
| Polyvinyl acetate (MW ~12,900) | 15.0 |
| Polyvinyl acetate (MW ~14,000) | 8.0 |
| Polyvinyl acetate (MW ~25,000) | 24.7 |
| Polyvinyl acetate (MW ~40,000) | 5.3 |
| Filler (talc) | 8.5 |
| Datem* | 12.3 |
| Acid casein | 6.1 |
| Fine ground acid casein | 6.2 |
| Polyglycerol polyricinoleate | 7.9 |
| Acetylated monoglycerides (Myvacet 7-07) | 2.1 |
| Lecithin (Emulgum) | 2.2 |
| Calcium stearoyl-2-lactylate | 1.2 |
| Calcium chloride | 0.5 |

*Diacetyl tartaric esterified mono- and di-glycerides

A gum base was prepared having the above formulation using a similar method to that of Example 2.

A chewing gum was then prepared having the formulation shown below, using the method described in Example 2, with the exception that the glycerol triacetate and stearic acid were also added in step 1.

| Ingredient | % (weight/weight) |
| --- | --- |
| Gum base | 24.60 |
| Powdered sugar | 49.92 |
| Glucose syrup | 22.64 |
| Glycerol triacetate | 0.75 |
| Stearic acid | 1.00 |
| Flavour | 1.08 |

Examples 4–6

Gum bases having the following formulations were prepared, using the same preparative method as that described above for Example 2, with the exceptions that, where antioxidant, paraffin and/or stearic acid were included in the formulation, these were added together with the Datem, acetylated monoglycerides and calcium stearoyl-2-lactylate. Where carrageenan was present, this was added together with the casein and/or polymerised casein (when present).

| | % (weight/weight) | | |
| --- | --- | --- | --- |
| Ingredients | Example 4 Formulation 1 | Example 5 Formulation 2 | Example 6 Formulation 3 |
| PVAc (MW ~12,900) | 15.0 | 15.14 | 8.15 |
| PVAc (MW ~14,000) | 8.0 | 8.07 | 15.28 |
| PVAc (MW ~25,000) | 24.7 | 12.94 | 13.06 |
| PVAc (MW ~40,000) | 5.3 | 16.37 | 16.51 |
| Filler (talc) | 8.5 | 7.87 | 10.83 |
| Datem (diacetyl tartaric esterified mono- and di-glycerides) | 12.3 | 12.42 | 3.29 |
| Acid casein | 12.3 | 12.43 | 9.87 |
| Polymerised casein | 0 | 0 | 6.58 |
| Polyglycerol polyricinoleate | 7.9 | 7.98 | 8.46 |
| Acetylated monoglycerides (Myvacet 7.07) | 2.1 | 2.13 | 2.26 |
| Lecithin (Emulpure N) | 2.2 | 2.22 | 2.02 |
| Calcium stearoyl-2-lactylate | 1.2 | 1.21 | 1.28 |
| Stearic acid | | 0.00 | 1.16 |
| Calcium chloride | 0.5 | 0.51 | 0.54 |
| Paraffin | 0.00 | 1.00 | |
| Carrageenan | | 0.72 | 0.76 |
| Antioxidant (Sustane 1F) | | | 0.03 |

Chewing gums having the following formulations were prepared from the above gum bases.

| | % (weight/weight) | | |
| --- | --- | --- | --- |
| Ingredients | Example 4 Formulation 1 | Example 5 Formulation 2 | Example 6 Formulation 3 |
| Gum base | 24.60 | 24.98 | 24.97 |
| Powdered sugar | 49.92 | 49.12 | 48.93 |
| Glucose syrup | 22.64 | 22.98 | 22.97 |
| Glycerol triacetate | 0.75 | 1.00 | 1.20 |
| Stearic acid | 1.00 | 1.00 | 1.00 |
| Flavour | 1.08 | 0.93 | 0.93 |

The chewing gums were prepared using the same method as that described above in Examples 2 and 3.

Examples 7–12

Gum bases having the following formulations were prepared, using the same preparative method as that described above for Examples 4–6. Where polymerised casein or hydrolysed polymerised casein was included, this was added together with the casein.

| | % (weight/weight) | | | | | |
| --- | --- | --- | --- | --- | --- | --- |
| Ingredients | Ex. 7 F1 | Ex. 8 F2 | Ex. 9 F3 | Ex. 10 F4 | Ex. 11 F5 | Ex. 12 F6 |
| PVAc (MW ~12,900) | 15.14 | 14.81 | 16.04 | 15.25 | 8.15 | 8.15 |
| PVAc (MW ~14,000) | 8.07 | 7.90 | 8.56 | 8.14 | 15.28 | 15.28 |
| PVAc (MW ~25,000) | 12.94 | 12.65 | 13.71 | 13.04 | 13.06 | 13.06 |
| PVAc (MW ~40,000) | 16.37 | 16.01 | 17.34 | 16.49 | 16.51 | 16.51 |

-continued

| | % (weight/weight) | | | | | |
|---|---|---|---|---|---|---|
| Ingredients | Ex. 7 F1 | Ex. 8 F2 | Ex. 9 F3 | Ex. 10 F4 | Ex. 11 F5 | Ex. 12 F6 |
| Filler (talc) | 7.87 | 7.70 | 7.76 | 14.35 | 10.83 | 10.83 |
| Datem* | 12.42 | 12.15 | 3.29 | 1.67 | 3.29 | 3.29 |
| Acid casein | 6.17 | 6.03 | 6.53 | 6.52 | 4.89 | 4.89 |
| Fine ground acid casein | 6.26 | 6.12 | 6.63 | 6.63 | 4.98 | 4.98 |
| Polyglycerol polyricinoleate | 7.98 | 7.81 | 10.58 | 9.88 | 8.46 | 8.46 |
| Acetylated monoglycerides (Myvacet 7-07) | 2.13 | 2.08 | 2.26 | 2.25 | 2.26 | 2.26 |
| Lecithin | 2.22 | 2.17 | 2.35 | 2.02 | 2.02 | 2.02 |
| Calcium stearoyl-2-lactylate | 1.21 | 1.18 | 1.28 | 0.64 | 1.28 | 1.28 |
| Stearic acid | 0.00 | 1.08 | 1.17 | 1.16 | 1.16 | 1.16 |
| Calcium chloride | 0.51 | 0.50 | 0.54 | 0.54 | 0.54 | 0.54 |
| Paraffin | 0.00 | 1.08 | 1.17 | 1.00 | 1.00 | 1.00 |
| Carrageenan | 0.72 | 0.70 | 0.76 | 0.76 | 0.76 | 0.76 |
| Antioxidant (sustane 1F) | | | 0.04 | 0.03 | 0.03 | 0.03 |
| Polymerised casein | | | | | 6.58 | |
| Hydrolysed polymerised casein | | | | | | 6.58 |

Method of Preparing Polymerised Casein

The "polymerised casein" referred to in Examples 4–12 is acid casein which has been modified using the enzyme transglutaminase. This was prepared using the following method:

A 0.1 M Tris-HCl buffer (pH 8.0) containing 5 mM $CaCl_2$, 10 mM dithiothreitol and 0.1% glycerol was prepared. Acid casein (7.5% weight/volume) and Guinea pig liver transglutaminase (0.015 units/mg casein, Sigma) were added to the buffer. The solution was stirred and incubated at 37° C. until just prior to gelation. The reaction was terminated in a microwave oven by heating the solution to 90° C. (Heating was preferable to inactivation using an EDTA solution since it was thought some residual activity may persist during dialysis). The solution was dialysed in running water for 2 days followed by distilled water for 1 day (with 3 changes of water) then freeze dried.

Method of Preparing Hydrolysed Casein

The "hydrolysed polymerised casein" referred to in Examples 7–12 is acid casein which has been enzymatically hydrolysed and then repolymerised using the enzyme transglutaminase.

The method of preparation of the enzymatically hydrolysed and polymerised casein was as follows: An enzymatically hydrolysed casein, which had been hydrolysed using porcine pancreatic trypsin, with a degree of hydrolysis of approximately 4% of the total number of the peptide bonds, was selected as the starting material. A 0.1M Tris-HCl buffer (pH 8.0) containing 5 mM $CaCl_2$, 10 mM dithiothreitol and 0.1% glycerol was prepared. Hydrolysed casein (7.5% weight/volume) and Guinea pig liver transglutaminase (0.015 units/mg casein, Sigma) were added to the buffer. The solution was stirred and incubated at 37° C. for 5 hours. The reaction was terminated in a microwave oven by heating the solution to 90° C. The solution was dialysed in running water for 2 days followed by distilled water for 1 day (with 3 changes of water) then freeze dried.

Chewing gums having the following formulations were prepared from the gum bases:

| | % (weight/weight) | |
|---|---|---|
| Ingredient | A | B |
| Gum base | 31.74 | 31.74 |
| Powdered sorbitol | 41.39 | 41.39 |
| Maltitol syrup | 20.38 | 22.64 |
| Mannitol | 7.35 | 7.35 |
| Glycerol triacetate | 2.00 | 2.00 |
| Glycerol (96% solids) | 2.26 | |
| Acesulfame K | 0.75 | 0.75 |
| Flavour | 1.40 | 1.40 |

The gum bases numbered F1, F2 and F3 above (Examples 7–9) were made into chewing gums having formulation A. The gum bases F2, F3, F4, F5 and F6 (Examples 8–12) were made into chewing gums having formulation B. These chewing gums are all sugar-free.

Method of Preparation of Chewing Gum

The sugar-free chewing gum was produced from the gum base formulations of Examples 7–12 using a Brabender Plasticorder fitted with a W50 mixer (cam blades). Temperature set at 45° C. and mixer speed at 50 RPM.

The chewing gum was produced in 3 steps:
1) Gum base, glyerol triacetate, maltitol syrup, mannitol and glycerol (if included in formulation) were added to the mixer and mixed for 3 minutes;
2) The powdered sorbitol, acesulfame K and flavour were added, mixed for 3 minutes;
3) The gum mass was removed from the mixer and put through a set of rollers so a product thickness of 3 mm were obtained.

Biodegradability/Disintegrability

The following test was carried out on two chewing gums according to the present invention.

Purpose:

Evaluate the biodegradability of two (2) dairy based samples with replicates, exposed to Aerobic Diodegradation per ASTM D-5209 by contact with activated sewage sludge innoculum. Compare the results to the biodegradation rate of a positive control of cellulose.

| Sample Identification: | | Source: |
|---|---|---|
| A. | (2 ea) | Kiwitech Limited |
| B. | (2 ea) | |
| C. | Cellulose Positive control (2 ea) | AMC, Inc. |

The formulations of the gum base compositions of samples A and B (examples of compositions of the present invention) are shown below:

| | A | B |
|---|---|---|
| PVAc (MW ~12,900) | 20.0 | 21.9 |
| PVAc (MW ~25,000) | 33.0 | 36.1 |
| Filler (talc) | 6.5 | 1.5 |
| Datem | 12.3 | 12.3 |
| Casein | 6.1 | 6.1 |
| Fine acid casein | 6.2 | 6.2 |

-continued

|  | A | B |
|---|---|---|
| Polyglycerol polyricinoleate | 7.9 | 7.9 |
| Acetylated monoglycerides | 4.1 | 4.1 |
| Lecithin | 2.2 | 2.2 |
| Calcium stearoyl-2-lactylate | 1.2 | 1.2 |
| Calcium chloride | 0.5 | 0.5 |

Results:

The Aerobic Biodegradation per ASTM 5209 @ 20° C. testing of the two samples showed the following in comparison to cellulose based on (%) carbon conversion efficiency:

|  | Average Carbon Conversion (%) (Based on $CO_2$ Production) |
|---|---|
| Sample A | 28.86 |
| Sample B | 31.14 |
| Sample C  Positive cellulose control | 65.99 |

Cellulose had 100% weight loss indicating a successful test. Samples A and B had over 90% weight loss. Some weight loss due to degradation but most due to dissolving into solution. These results show that the chewing gums of the present invention disintegrated under the conditions of the test.

Adhesion Characteristics of Chewing Gums of the Invention

Method:

The adhesiveness of a chewing gum of the present invention and conventional, commercially available chewing gums were analysed by the degree of difficulty required removing the sample from a heated brick. For this test, 3–4 g of gum was chewed for 5 minutes, and then firmly pressed onto a brick preheated to 20° C., 30° C., 55° C. or 70° C. and then held at that temperature for 48 hours at a relative humidity of 50%.

After incubation the gums were removed from the bricks with a scraper, and the ease of removal was recorded. The experiment was repeated four times.

Results:

| Temp | Residue | | Effort | | Stickiness | |
|---|---|---|---|---|---|---|
| ° C. | A | Conv | A | Conv | A | Conv |
| 20 | none | moderate | easy | difficult | very low | high |
| 30 | none | moderate | easy | difficult | very low | high |
| 55 | none | moderate | easy | difficult | low | high |
| 70 | low | moderate | easy | difficult | low | high |

Conv = Commercially available chewing gum
A = chewing gum according to the present invention, having the same formulation as that described in Example 3, with the exception that glycerol triacetate was not included.

CONCLUSION

From this experiment, it can be seen that the two gums have substantially different adhesion properties. The gum of the invention has very low or no adhesion to a brick surface across a range of temperatures. The conventional gum has a high adhesion to brick, which makes the gums difficult to remove across the temperature range sampled.

INDUSTRIAL APPLICATION

It is believed that chewing gums according to the present invention prepared from a chewable gum base containing casein and/or modified casein particles dispersed throughout a polyvinyl acetate matrix, will find widespread acceptance with consumers.

Chewing gums according to the invention, at least in the preferred embodiments, have a combination of desirable properties. The gums when freshly chewed have been found to be sufficiently non-sticky that they can easily be removed from most surfaces including carpet. If allowed to dry on a surface the gum will easily flake off.

In addition, the chewing gums of the invention have been found to be disintegrable and are made substantially of biodegradable components.

The gums of the present invention, at least in the preferred embodiments, exhibit good chewing properties, including good cohesion during chewing and good "bubble blowing" properties. On chewing the gums have been found to possess an excellent initial chew; the gum does not break into pieces on chewing but remains as one piece. The gums exhibit minimal change in firmness on chewing for 15 to 20 minutes with no tooth tack or face tack.

In addition, at least in the preferred embodiments, the chewing gums of the present invention possess good flexibility and a desirable appearance.

It will be appreciated that the above description is provided by way of example only and numerous variations and modifications will be apparent to those persons skilled in the art without departing from the scope of the invention as defined in the following claims.

The invention claimed is:

1. A chewable gum base composition comprising (a) a polyvinyl acetate matrix, wherein the polyvinyl acetate is in the form of a continuous phase, and (b) casein, a modified casein, or both casein and a modified casein, wherein particles of casein and/or modified casein are dispersed throughout the polyvinyl acetate matrix and wherein the polyvinyl acetate comprises a blend of polyvinyl acetates having differing molecular weights.

2. A chewable gum base composition as claimed in claim 1 which contains acid casein.

3. A chewable gum base composition as claimed in claim 1 which contains acid casein and fine ground acid casein.

4. A chewable gum base composition as claimed in claim 1 which contains acid casein and a modified casein, wherein the modified casein is selected from casein polymerised using transglutaminase and hydrolysed casein polymerised using transglutaminase.

5. A chewable gum base composition as claimed in claim 1 wherein the casein, the modified casein, or both, are present in a combined amount of about 5 to about 30% by weight of the composition.

6. The composition of claim 5, wherein the casein, the modified casein, or both, are present in a combined amount about 12 to about 16.5% by weight, of the composition.

7. A chewable gum base composition as claimed in claim 1 wherein the polyvinyl acetate comprises a blend of four polyvinyl acetates having molecular weights of approximately 12,900, 14,000, 25,000 and 40,000 respectively.

8. A chewable gum base composition as claimed in claim 1, wherein the polyvinyl acetate or a blend of polyvinyl acetates is present in the composition in an amount of from about 20% to about 65% by weight of the composition.

9. The composition of claim 8, wherein the polyvinyl acetate or blend of polyvinyl acetates is present in the composition in an amount of from about 35% to about 56% by weight of the composition.

10. A chewable gum base composition as claimed in claim 1, which further includes a filler in an amount of up to about 25% by weight of the composition.

11. A chewable gum base composition as claimed in claim 1 which further includes talc as a filler, and is present in an amount of about 7% to about 13% by weight of the composition.

12. A chewable gum base composition as claimed in claim 1 which further includes one or more components selected from plasticizers and emulsifiers.

13. A chewable gum base composition as claimed in claim 1 which includes mono- and di-glycerides esterified with mono-acetyl and di-acetyl tartaric acid, in an amount of about 1 to about 24% by weight of the composition.

14. A chewable gum base composition as claimed in claim 1 which includes acetylated mono- and/or di-glycerides, in an amount of up to about 24% by weight of the composition.

15. A chewable gum base composition as claimed in claim 1 which includes polyglycerol polyricinoleate, in an amount of about 4.4% to about 20% by weight of the composition.

16. A chewable gum base composition as claimed in claim 1 which includes lecithin, in an amount of up to about 6% by weight of the composition.

17. A chewable gum base composition as claimed in claim 1 which includes sodium stearoyl-2-lactylate or calcium stearoyl-2-lactylate, in an amount of up to about 5% by weight of the composition.

18. A chewable gum composition as claimed in claim 1 which includes a calcium salt, in an amount of up to about 1.5% by weight of the composition.

19. A chewable gum base composition as claimed in claim 1 which further includes a protein-containing whey derivative.

20. A confectionery product comprising a chewable gum base composition as claimed in claim 1.

21. A chewing gum comprising a chewable gum base composition as claimed in claim 1, and one or more components selected from sweeteners and flavouring agents.

22. A chewing gum as claimed in claim 21, further including glycerol triacetate, in an amount of from about 0.5% to about 4% by weight of the chewing gum.

23. A chewing gum as claimed in claim 21, further including stearic acid, in an amount of from about 0.5% to about 1.5% by weight of the chewing gum.

24. A chewing gum as claimed in claim 21, wherein the gum base composition is present in an amount of about 20% to 50% by weight of the chewing gum.

* * * * *

UNITED STATES PATENT AND TRADEMARK OFFICE
CERTIFICATE OF CORRECTION

PATENT NO. : 7,056,542 B1
APPLICATION NO. : 10/182225
DATED : June 6, 2006
INVENTOR(S) : Bridger et al.

It is certified that error appears in the above-identified patent and that said Letters Patent is hereby corrected as shown below:

In Col. 7, line 8 (approximately), please delete "Ch Wing" and insert --Chewing--, therefor.

In Col. 12, line 28 (approximately), please delete "glyerol" and insert --glycerol--, therefor.

In Col. 14, line 60, Claim 6, after "amount" please insert --of--.

In Col. 16, line 6 (approximately), Claim 18, please delete "gum" and insert --gum base-- therefor.

Signed and Sealed this

Twenty-sixth Day of December, 2006

JON W. DUDAS
*Director of the United States Patent and Trademark Office*